(12) United States Patent
Xue

(10) Patent No.: US 9,965,068 B2
(45) Date of Patent: May 8, 2018

(54) METHOD AND DEVICE FOR OPERATING TERMINAL HAVING TOUCH SCREEN

(75) Inventor: Tao Xue, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 104 days.

(21) Appl. No.: 14/386,692

(22) PCT Filed: May 15, 2012

(86) PCT No.: PCT/CN2012/075530
§ 371 (c)(1),
(2), (4) Date: Sep. 19, 2014

(87) PCT Pub. No.: WO2013/139075
PCT Pub. Date: Sep. 26, 2013

(65) Prior Publication Data
US 2015/0035775 A1    Feb. 5, 2015

(30) Foreign Application Priority Data

Mar. 20, 2012  (CN) .......................... 2012 1 0074430

(51) Int. Cl.
G06F 3/041    (2006.01)
G06F 3/045    (2006.01)
G06F 3/0488   (2013.01)

(52) U.S. Cl.
CPC ........ G06F 3/0412 (2013.01); G06F 3/04883 (2013.01); G06F 3/04886 (2013.01);
(Continued)

(58) Field of Classification Search
CPC ....... G06F 3/04883; G06F 2203/04808; G06F 3/0488
See application file for complete search history.

(56) References Cited

U.S. PATENT DOCUMENTS

2009/0174679 A1*  7/2009  Westerman ......... G06F 3/03547
                                                  345/173
2010/0002016 A1*  1/2010  Kim ..................... G06F 3/0416
                                                  345/660
(Continued)

FOREIGN PATENT DOCUMENTS

CN    101271371 A    9/2008
CN    101539820 A    9/2009
(Continued)

OTHER PUBLICATIONS

Supplementary European Search Report in European application number: 12872155.2, dated Mar. 31, 2015.
(Continued)

*Primary Examiner* — Nan-Ying Yang
(74) *Attorney, Agent, or Firm* — Oppedahl Patent Law Firm LLC

(57) ABSTRACT

The present application discloses a method and a device for operating a terminal having a touch screen, and the method includes steps of: starting to count a predetermined first time period when a predetermined condition is met; when an operation is performed by a user on a predetermined non-readily-mis-pressed region of the touch screen during the first time period, implementing the operation, otherwise implementing an operation performed by the user on a readily-mis-pressed region. The method and the device for operating a terminal having a touch screen provided by the disclosure solve the problem of error operations when a user holds the terminal by one hand and performs operations, thereby providing the user with conveniences.

4 Claims, 6 Drawing Sheets

(52) U.S. Cl.
CPC .............. *G06F 2203/04104* (2013.01); *G06F 2203/04803* (2013.01)

(56) References Cited

U.S. PATENT DOCUMENTS

| | | | | |
|---|---|---|---|---|
| 2012/0158629 A1* | 6/2012 | Hinckley | ................ | G06F 3/038 706/15 |
| 2012/0172091 A1* | 7/2012 | Kurane | ................ | G06F 3/0488 455/566 |
| 2012/0223906 A1 | 9/2012 | Zhou | | |

FOREIGN PATENT DOCUMENTS

| | | | |
|---|---|---|---|
| CN | 101556517 A | 10/2009 | |
| CN | 101741985 A | 6/2010 | |
| CN | 101847055 A | 9/2010 | |
| CN | 102063255 A | 5/2011 | |
| CN | 102221932 A | 10/2011 | |
| CN | 102339196 A | 2/2012 | |
| EP | 2506126 A1 | 10/2012 | |
| WO | 2011037149 A1 | 3/2011 | |
| WO | WO 2011037149 A1 * | 3/2011 | ........... G06F 3/0488 |
| WO | 2011065249 A1 | 6/2011 | |

OTHER PUBLICATIONS

International Search Report in international application number: PCT/CN2012/075530, dated Aug. 30, 2012. (2 pages—see entire document).

English Translation of the Written Opinion of the International Search Authority in international application number: PCT/CN2012/075530, dated Aug. 30, 2012. (6 pages—see entire document).

\* cited by examiner

METHOD AND DEVICE FOR OPERATING TERMINAL HAVING TOUCH SCREEN

TECHNICAL FIELD

The disclosure relates to the field of communications, and in particular to a method and a device for operating a terminal having a touch screen.

BACKGROUND

For an existing mobile terminal having a touch screen, when operations are performed by controlling the screen, these various operations on the mobile terminal are usually completed with different hand gestures on the touch screen of the mobile terminal, such as a single-point touch (long press, short press, double click), a multiple-point touch, a sliding operation (direct slide, slide after pressing for a period of time) and the like.

The above operations seem rational, but there may exist parsing errors during user experiences. When a user holds a mobile terminal with one hand and operates using his/her thumb, a palm portion contacting with a touch screen thereof at the end of the thumb will readily result in mis-press during the operation of the touch screen and thus result in parsing errors in the mobile terminal, therefore, desired operations by the user cannot be implemented. For example, when a user browses images on a mobile terminal held by one hand, an operation of switching images to be browsed cannot be always well implemented through left/right slides or clicks by a thumb, but it often turns out to be a pop-up prompt image message, which indicates a menu of operations applicable to an image or a zoom in/out operation on the image, and a reason of generating such an operation is that a portion of the palm connecting with the thumb contacts with a lower portion of the touch screen when the thumb performs slide or click operations, which results in that a click operation on the lower portion of the touch screen is detected, and a corresponding service logic is implemented after the mobile terminal parses multiple detected operations, thereby a switching of images to be browsed desired to be performed by the user cannot be normally performed. Similar parsing error may occur in below scenarios:

1) a user performs operations of selecting a directory, a file or a contact person through upwards/downwards slides by a thumb over a list interface when holding a mobile terminal by one hand;

2) a user performs a upwards/downwards line change or a page turning in a document through a thumb with a mobile terminal held by one hand when the user reads a novel or a technical document having too many pages;

3) a user performs a page turning or selection on a multi-page application through a thumb when holding a mobile terminal by one hand; and 4) a user performs a page turning and a selection of a linkage during a webpage browsing through a thumb when holding a mobile terminal by one hand.

There are no good solutions in the existing technology, which brings users with inconveniences.

SUMMARY

The disclosure is intended to provide a method and a device for operating a terminal having a touch screen, so as to solve the problem of error operations when a user holds the terminal by one hand and performs operations, thereby providing the user with conveniences.

The disclosure proposes a method for operating a terminal having a touch screen, and the method includes the following steps:

a predetermined first time period is started to be counted when a predetermined condition is met;

when an operation is performed by a user on a predetermined non-readily-mis-pressed region of the touch screen during the first time period, the operation is implemented, otherwise an operation performed by the user on a readily-mis-pressed region is implemented.

Preferably, before the predetermined first time period is started to be counted, the method may further include:

the readily-mis-pressed region and the non-readily-mis-pressed region of the touch screen are set.

Preferably, the predetermined condition may include:

pressing the readily-mis-pressed region, pressing the readily-mis-pressed region for a predetermined second time period or multi-touching the readily-mis-pressed region.

Preferably, the operation performed by the user on the readily-mis-pressed region or the non-readily-mis-pressed region may include:

a list interface operation, a document operation, a multi-page application switching operation or a webpage operation.

Preferably, the step of implementing an operation performed by the user on the non-readily-mis-pressed region may include:

an operation performed by the user on the touch screen is monitored, and it is determined whether the operation is performed on the readily-mis-pressed region or the non-readily-mis-pressed region;

when the operation is performed on the non-readily-mis-pressed region, the operation is performed.

The disclosure proposes a device for operating a terminal having a touch screen, and the device includes:

a timing module configured to start to count a predetermined first time period when a predetermined condition is met;

an operation module configured to, when an operation is performed by a user on a predetermined non-readily-mis-pressed region of the touch screen during the first time period, implement the operation, otherwise implement an operation performed by the user on a readily-mis-pressed region.

Preferably, the device may further include:

a setting module configured to set the readily-mis-pressed region and the non-readily-mis-pressed region of the touch screen.

Preferably, the predetermined condition may include:

pressing the readily-mis-pressed region, pressing the readily-mis-pressed region for a predetermined second time period or multi-touching the readily-mis-pressed region.

Preferably, the operation performed by the user on the readily-mis-pressed region or the non-readily-mis-pressed region may include:

a list interface operation, a document operation, a multi-page application switching operation or a webpage operation.

Preferably, the operation module may include:

a monitoring unit configured to monitor an operation performed by the user on the touch screen and determine whether the operation is performed on the readily-mis-pressed region or the non-readily-mis-pressed region;

an implementation unit configured to, when the operation is performed on the non-readily-mis-pressed region, implement the operation.

By means of the method and the device for operating a terminal having a touch screen disclosed by the disclosure, a user can rapidly and simply, without changing usage habits and operation manners, accurately implement user operations, thereby improving greatly user experiences on a terminal. In addition, the method and the device can be applicable to various types of terminals, and an operator is only desired to make appropriate modifications to softwares in a user terminal so as to meet requirements.

DETAILED DESCRIPTION

It should be understood that the specific embodiments are only used to interpret the disclosure instead of limiting the disclosure.

Figure 1:
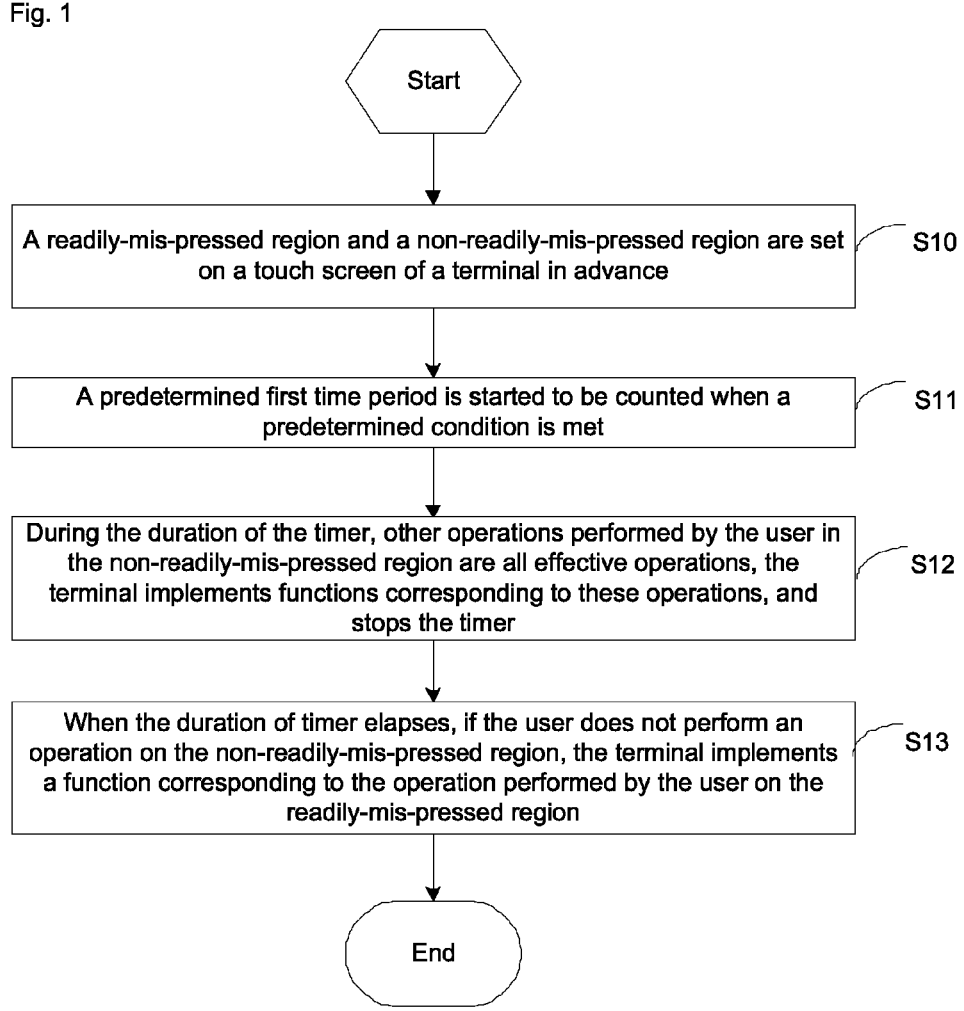
FIG. 1 is a schematic flow chart according to an embodiment of the method for operating a terminal having a touch screen provided by the disclosure.

Referring to FIG. 1, proposed is an embodiment of the method for operating a terminal having a touch screen according to the disclosure, and the method includes the following steps:

S10, a readily-mis-pressed region and a non-readily-mis-pressed region are set on a touch screen of a terminal.

When a user uses a terminal having a touch screen, there may be multi-point contacts between his/her hand(s) and the touch screen, thus an error operation is generated, therefore a readily-mis-pressed region and a non-readily-mis-pressed region are set in advance on the touch screen of the terminal. When the terminal is held by both hands, if the user wants to operate the terminal with his/her left hand, the right hand may touch mistakenly the touch screen of the terminal, therefore a region on the touch screen touched by the left hand of the user is set as a non-readily-mis-pressed region, while a region on the touch screen which may be contacted by the right hand of the user is set as a readily-mis-pressed region. Practical application scenarios are not limited to the above scenario. A typical application scenario is the case that a terminal is held by one hand, and multiple readily-mis-pressed regions can be set in a region where a palm may readily press, when a terminal such as a mobile phone is held by one hand. It is necessary to consider different readily-mis-pressed regions when a terminal is held by a left/right hand, and only one readily-mis-pressed region takes effect at a time, i.e., when a user holds a terminal with his/her left hand, a certain readily-mis-pressed region corresponding to a left-hand held manner is set to be effective, while a readily-mis-pressed region corresponding to a right-hand held manner is set to be ineffective. The embodiment is so described in an application scenario where the terminal is held by one hand, and in practical use, other application scenarios are also applicable.

S11, when a predetermined condition is met, for example, when a user presses the readily-mis-pressed region or presses the readily-mis-pressed region for a predetermined second time period, then a timer set in advance is started, wherein the duration of the timer (referred to as the first time period) can be set by a user according to his/her usage habits.

S12, during the duration of the timer, other operations performed by the user on the non-readily-mis-pressed region are all effective operations, the terminal implements functions corresponding to these operations, and stops the timer; wherein operations performed by the user on the non-readily-mis-pressed region can be operations which can trigger corresponding functions such as a single-point touch (long press, short press, double click), a multiple-point touch, a sliding operation (direct slide, slide after pressing for a period of time) and the like.

S13, when the duration of timer elapses, if the user does not perform an operation on the non-readily-mis-pressed region, the terminal implements a function corresponding to the operation performed by the user on the readily-mis-pressed region.

In order to make the disclosure clearer, the disclosure will be elaborated through below specific examples.

Figure 2:
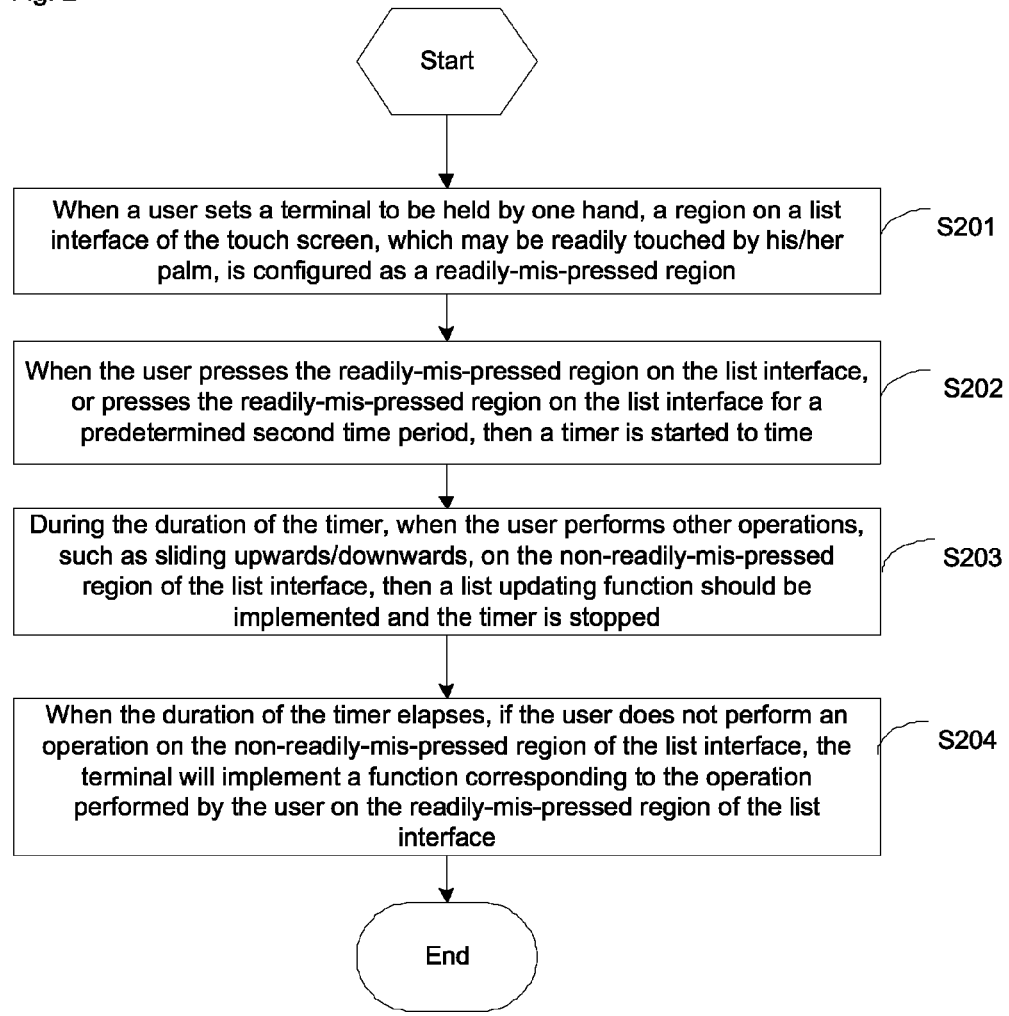
FIG. 2 is a schematic flow chart of an example according to an embodiment of the method for operating a terminal having a touch screen provided by the disclosure.

Referring to FIG. 2, it is a flow chart of a method for solving error operations on a list interface, and the method includes the following steps:

S201, when a user sets a terminal to be held by one hand, a region on a list interface of the touch screen, which may be readily touched by his/her palm, is set as a readily-mis-pressed region, and the readily-mis-pressed region includes a region on the list interface of the touch screen which may be readily touched by the palm of his/her left hand and a region on the list interface of the touch screen which may be readily touched by the palm of his/her right hand, while other regions of the touch screen are then set as a non-readily-mis-pressed region.

S202, when the user presses the readily-mis-pressed region on the list interface, or presses the readily-mis-pressed region on the list interface for a predetermined second time period such as 2 seconds, then a timer is started to time, and the time duration can be set according to needs, such as 5 seconds. At this time, the terminal automatically records an original operation of the readily-mis-pressed region of the set list interface, with respect to this example, functions corresponding to possible operations on the readily-mis-pressed region of the list interface include but are not limited to: clicking to open an animation, a menu; playing music; or sliding to change display status. When the user performs simultaneously or sequentially multiple operations on the readily-mis-pressed region, the terminal analyzes the multiple operations, then selects and automatically records one of them, such as the one with highest priority.

After the user implements step S202, the terminal temporarily does not implement functions corresponding to the operations performed by the user, but it should allow some changes to occur on the interface of the touch screen so as to identify the operations of the user, for example, a readily-mis-pressed region of the list interface pressed by the user and other regions not being pressed are indicated in different background colors, or the readily-mis-pressed region of the list interface pressed by the user becomes to be in a shaking status.

S203, during the duration of the timer, i.e., within 5 seconds, when the user performs other operations, such as sliding upwards/downwards, on the non-readily-mis-pressed region of the list interface, then a list updating function should be implemented and the timer is stopped.

Further, after the user performs operations on the non-readily-mis-pressed region of the list interface, the terminal should cancel changes identified on the readily-mis-pressed region caused by pressing the readily-mis-pressed region by the user in step S202, and implement the list updating function.

S204, when the duration of the timer elapses, if the user does not perform an operation on the non-readily-mis-pressed region of the list interface, the terminal will implement a function corresponding to the operation performed by the user on the readily-mis-pressed region of the list interface, i.e., implement the operation on the readily-mis-pressed region recorded by the terminal in step S202, such as opening a certain list or popping-up a new menu.

Figure 3:
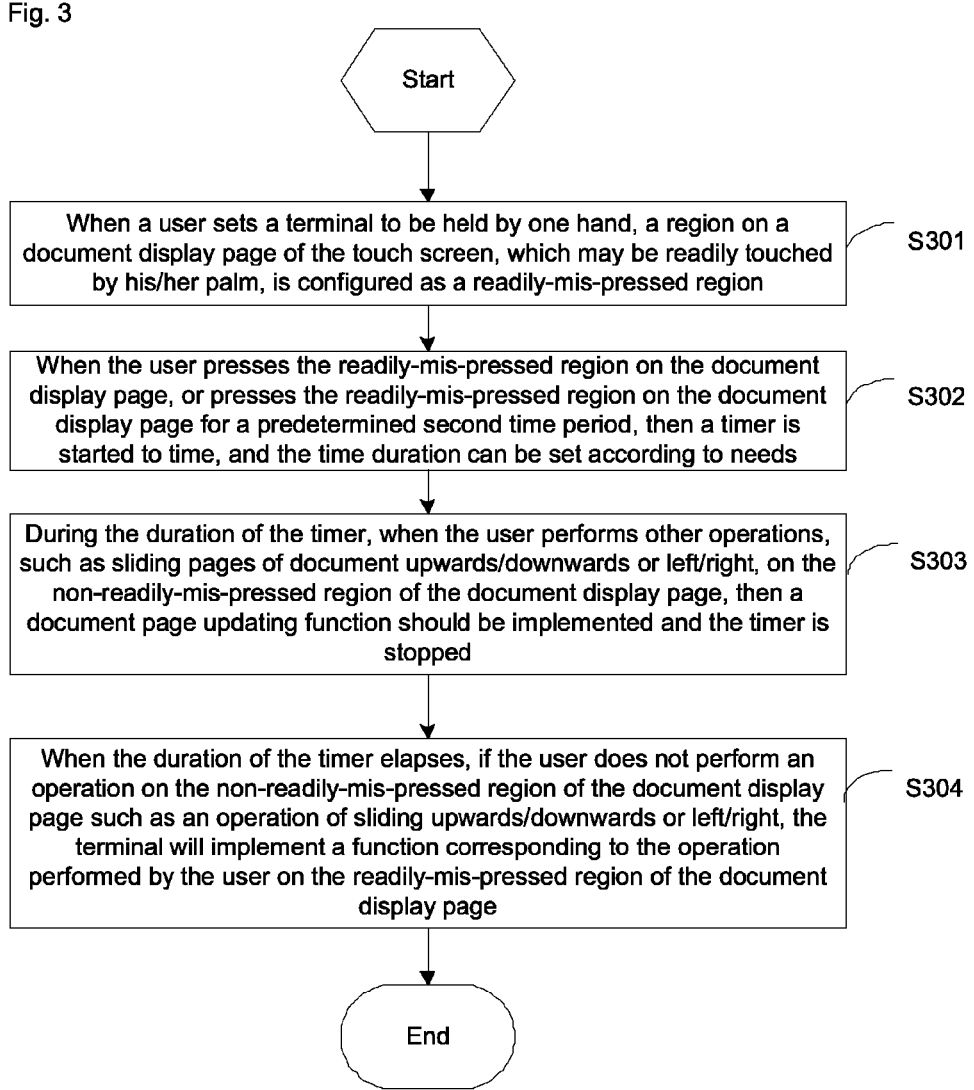
FIG. 3 is a schematic flow chart of a further example according to an embodiment of the method for operating a terminal having a touch screen provided by the disclosure.

Referring to FIG. 3, it is a flow chart of a method for solving error operations on a document and the method includes the following steps:

S301, when a user sets a terminal to be held by one hand, a region of the touch screen, where his/her palm may readily touch a document display page, is configured as a readily-mis-pressed region, and the readily-mis-pressed region includes a region of the touch screen where the palm of his/her left hand may readily touch the document display page and a region of the touch screen where the palm of his/her right hand may readily touch the document display page, while other regions of the touch screen are then configured as a non-readily-mis-pressed region.

S302, when the user presses the readily-mis-pressed region on the document display page, or presses the readily-mis-pressed region on the document display page for a predetermined second time period such as 2 seconds, then a timer is started to count the time, and the time duration can be set according to needs, such as 5 seconds. At this moment, the terminal automatically records an original operation in the readily-mis-pressed region of the set document display page. With respect to this example, the functions corresponding to possible operations in the readily-mis-pressed region of the document display page include but are not limited to: clicking to open an operation menu related to the document, adding a comment and a label, and switching pages and font sizes. When the user performs simultaneously or sequentially multiple operations on the readily-mis-pressed region, the terminal analyzes the multiple operations, then selects and automatically records one of them, such as the one with highest priority.

After the user implements step S202, the terminal temporarily does not implement functions corresponding to the operations performed by the user, but it should allow some changes to occur on the document display page so as to identify the operations of the user, for example, a readily-mis-pressed region of the document display page pressed by the user and other regions not being pressed are indicated in different background colors, or the readily-mis-pressed region of the document display page pressed by the user becomes to be in a shaking status.

S303, during the duration of the timer, i.e., within 5 seconds, when the user performs other operations, such as sliding pages of document upwards/downwards or left/right, on the non-readily-mis-pressed region of the document display page, then a document page updating function should be implemented and the timer is stopped.

Further, after the user performs operations on the non-readily-mis-pressed region of the document display page, the terminal should cancel changes indicated on the readily-mis-pressed region of the document display page caused by pressing the readily-mis-pressed region of the document display page by the user in step S302, and implement the document updating function.

S304, after the duration of the timer elapses, if the user does not perform an operation on the non-readily-mis-pressed region of the document display page such as an operation of sliding upwards/downwards or left/right, the terminal will implement a function corresponding to the operation performed by the user on the readily-mis-pressed region of the document display page, i.e., implement the operation on the readily-mis-pressed region recorded by the terminal in step S302, such as opening an option menu for related operations or implement other operation functions of the document.

Figure 4:
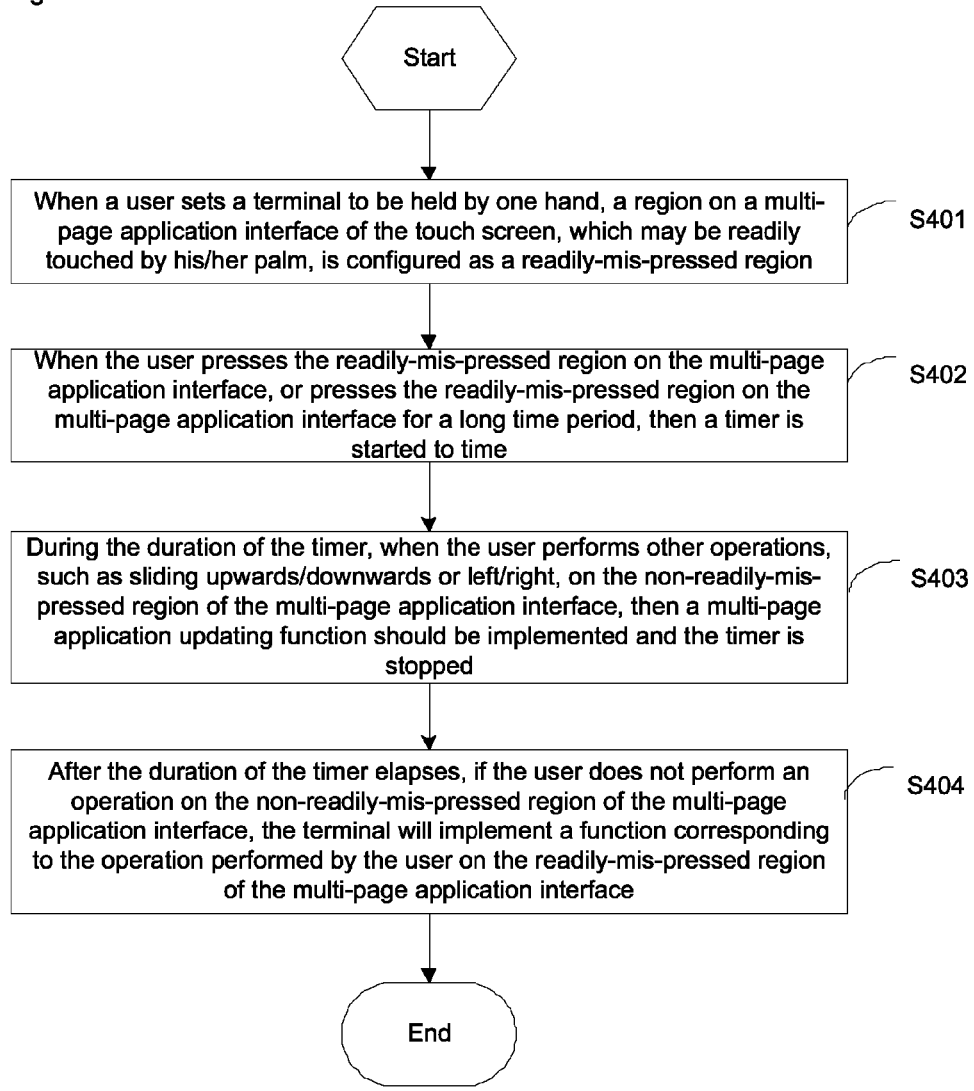
FIG. 4 is a schematic flow chart of a further example according to an embodiment of the method for operating a terminal having a touch screen provided by the disclosure.

Referring to FIG. 4, it is a flow chart of a method for solving error operations on multi-page application switching, and the method includes the following steps:

S401, when a user sets a terminal to be held by one hand, a region on a multi-page application interface of the touch screen, which may be readily touched by his/her palm, is configured as a readily-mis-pressed region, and the readily-mis-pressed region includes a region on the multi-page application interface of the touch screen which may be readily touched by the palm of his/her left hand and a region on the multi-page application interface of the touch screen which may be readily touched by the palm of his/her right hand, while other regions of the touch screen are then configured as a non-readily-mis-pressed region.

S402, when the user presses the readily-mis-pressed region on the multi-page application interface, or presses the readily-mis-pressed region on the multi-page application interface for a long time period, then a timer is started to time, and the time duration can be set according to needs, such as 5 seconds. At this moment, the terminal automatically records an original operation of the readily-mis-pressed region of the set multi-page application interface. With respect to this example, functions corresponding to possible operations on the readily-mis-pressed region of the multi-page application interface include but are not limited to clicking a multi-page application management operation menu, sorting, deleting, adding and hiding applications. When the user performs simultaneously or sequentially multiple operations on the readily-mis-pressed region, the terminal analyzes the multiple operations, then selects and automatically records one of them, such as the one with highest priority.

After the user operates according to step S402, the terminal temporarily does not implement functions corresponding to the operations performed by the user, but it should allow some changes to occur on the multi-page application interface so as to identify the operations of the user, for example, a readily-mis-pressed region of the multi-page application interface pressed by the user and other regions not being pressed are indicated in different background colors, or the readily-mis-pressed region of the multi-page application interface pressed by the user becomes to be in a shaking status.

S403, during the duration of the timer, i.e., within 5 seconds, when the user performs other operations, such as sliding upwards/downwards or left/right, on the non-readily-mis-pressed region of the multi-page application interface, then a multi-page application updating function should be implemented and the timer is stopped.

Further, after the user performs operations on the non-readily-mis-pressed region of the multi-page application interface, the terminal should cancel changes indicated on the readily-mis-pressed region of the multi-page application interface caused by pressing the readily-mis-pressed region of the multi-page application interface by the user in step S402, and implement the multi-page application updating function.

S404, after the duration of the timer elapses, if the user does not perform an operation on the non-readily-mis-pressed region of the multi-page application interface, the terminal will implement a function corresponding to the operation performed by the user on the readily-mis-pressed region of the multi-page application interface, i.e., implement the operation on the readily-mis-pressed region recorded by the terminal in step S402, such as opening an application management menu, and sorting, deleting, adding and hiding of applications.

Figure 5:
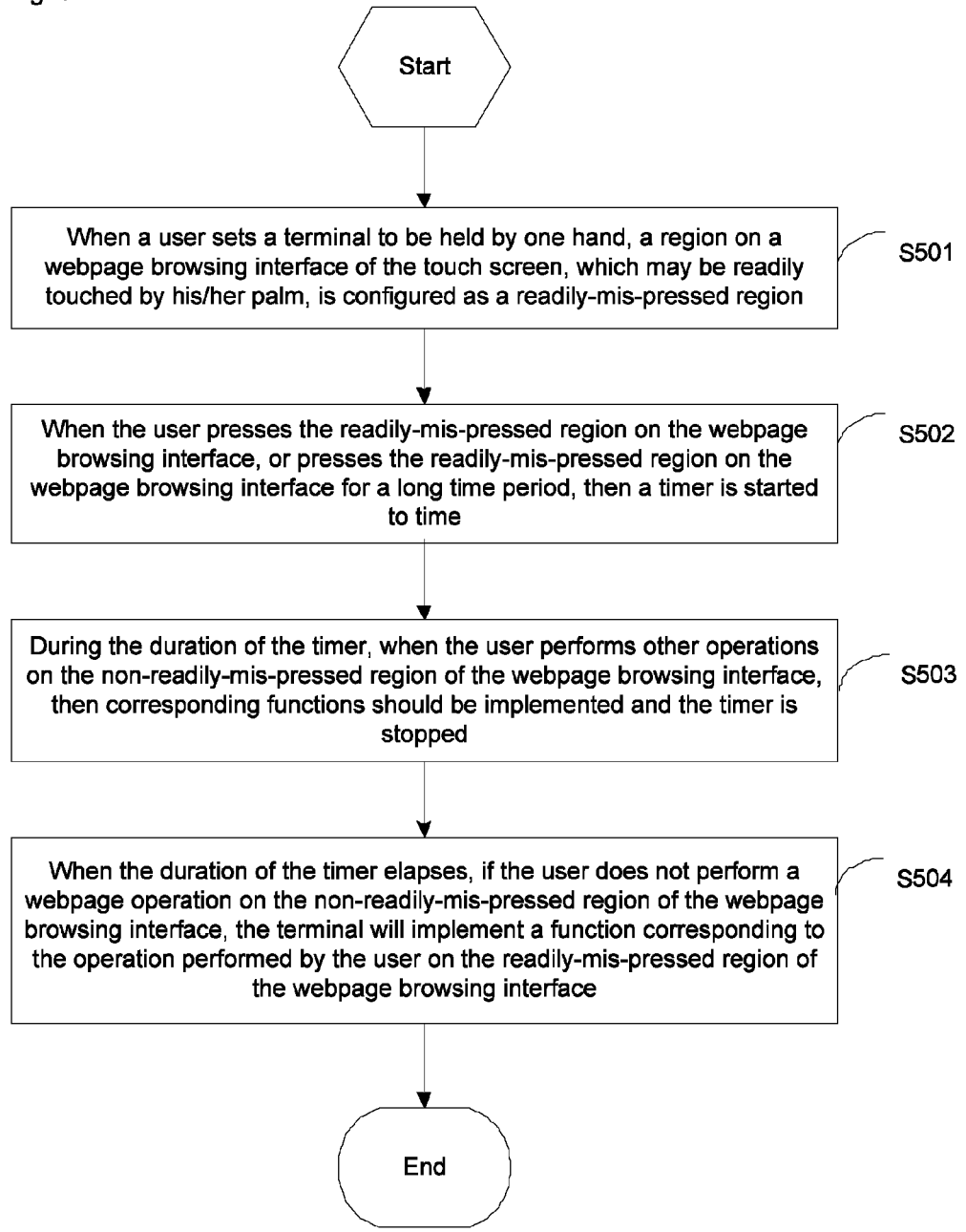
FIG. 5 is a schematic flow chart of a still further example according to an embodiment of the method for operating a terminal having a touch screen provided by the disclosure.

Referring to FIG. 5, it is a flow chart of a method for solving error operations on a webpage, and the method includes the following steps:

S501, when a user sets a terminal to be held by one hand, a region on a webpage browsing interface of the touch screen, which may be readily touched by his/her palm, is configured as a readily-mis-pressed region, and the readily-mis-pressed region includes a region on the webpage browsing interface of the touch screen which may be readily touched by the palm of his/her left hand and a region on the webpage browsing interface of the touch screen which may be readily touched by the palm of his/her right hand, while other regions of the touch screen are then configured as a non-readily-mis-pressed region.

S502, when the user presses the readily-mis-pressed region on the webpage browsing interface, or presses the readily-mis-pressed region on the webpage browsing interface for a long time period, then a timer is started to time, and the time duration can be set according to needs, such as 5 seconds. At this time, the terminal automatically records an original operation of the readily-mis-pressed region of the set webpage browsing interface. With respect to this example, functions corresponding to possible operations in the readily-mis-pressed region of the webpage browsing interface include but are not limited to regular operations on a webpage such as clicking a hypertext linkage and an image, audio playing, video playing and the like. When the user performs simultaneously or sequentially multiple operations on the readily-mis-pressed region, the terminal analyzes the multiple operations, then selects and automatically records one of them, such as the one with highest priority.

After the user implements the step S502, the terminal temporarily does not implement functions corresponding to the operations performed by the user, but it should allow some changes to occur on the webpage browsing interface so as to identify the operations of the user, for example, a readily-mis-pressed region of the webpage browsing interface pressed by the user and other regions not being pressed are indicated in different background colors, or the readily-mis-pressed region of the webpage browsing interface pressed by the user is changed to be in a shaking status.

Step 503, during the duration of the timer, i.e., within 5 seconds, when the user performs other operations, such as regular webpage operations such as clicking a certain hyper linkage and an image, audio playing and video playing, on the non-readily-mis-pressed region of the webpage browsing interface, then corresponding functions should be implemented and the timer is stopped.

Further, after the user performs operations on the non-readily-mis-pressed region of the webpage browsing interface, the terminal should cancel changes identified on the readily-mis-pressed region caused by pressing the readily-mis-pressed region of the webpage browsing interface by the user in step S502, and implements functions corresponding to webpage operations on the readily-mis-pressed region.

S504, after the duration of the timer elapses, if the user does not perform a webpage operation on the non-readily-mis-pressed region of the webpage browsing interface, the terminal will implement a function corresponding to the operation performed by the user on the readily-mis-pressed region of the webpage browsing interface, i.e., implement the operation on the readily-mis-pressed region recorded by the terminal in step S502, such as regular webpage operations such as clicking a certain hypertext linkage and an image, audio playing and video playing.

By means of the method for operating a terminal having a touch screen according to the embodiment, a user can rapidly and simply, without changing usage habits and operation manners, implement accurately user operations, thereby improving greatly user experiences on a terminal. In addition, the method and the device can be applicable to various types of terminals, and an operator is only desired to make appropriate modifications to softwares on a user terminal so as to meet requirements.

Figure 6:
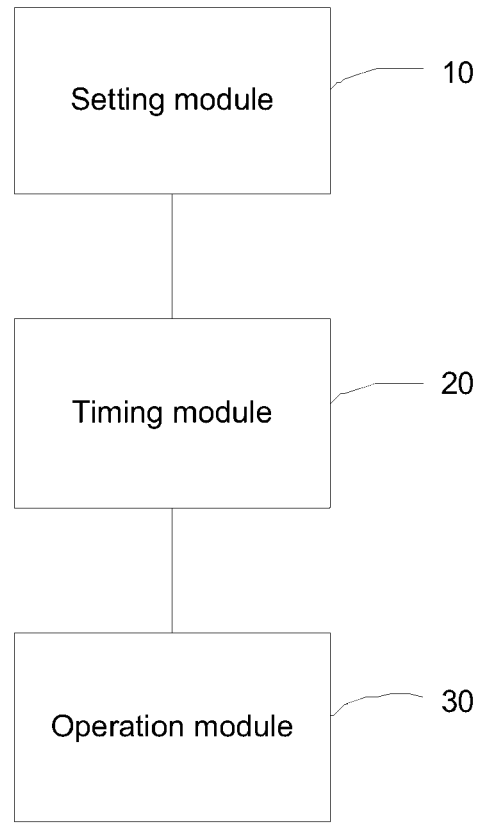
FIG. 6 is a schematic structural diagram according to an embodiment of the device for operating a terminal having a touch screen provided by the disclosure.

Referring to FIG. 6, which is a schematic structural diagram according to an embodiment of the device for operating a terminal having a touch screen provided by the disclosure, and device includes:

a setting module 10 configured to set a readily-mis-pressed region and a non-readily-mis-pressed region of the touch screen;

a timing module 20 configured to start to count a predetermined first time period when a predetermined condition is met;

an operation module 30 configured to, when an operation is performed by a user on a predetermined non-readily-mis-pressed region of the touch screen during the first time period, implement the operation, otherwise implement an operation performed by the user on a readily-mis-pressed region.

Figure 7:
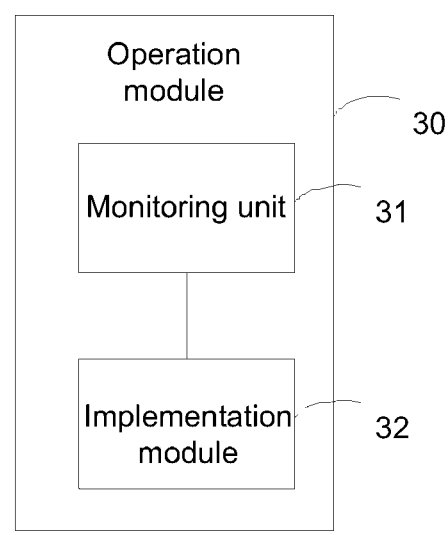
FIG. 7 is a schematic structural diagram of an operation module according to an embodiment of the device for operating a terminal having a touch screen provided by disclosure.

Referring to FIG. 7, the operation module 30 includes:

a monitoring unit 31 configured to monitor an operation performed by the user on the touch screen and determine whether the operation is performed on the readily-mis-pressed region or the non-readily-mis-pressed region; and an implementation unit 32 configured to, when the operation is performed on the non-readily-mis-pressed region, implement the operation.

The device according to the embodiment can be a terminal itself such as a mobile phone, and can also be a device arranged outside a terminal. When a user uses a terminal having a touch screen, there may be multi-point contacts between his/her hand(s) and the touch screen, thus an error operation is generated, therefore the setting module 10 sets in advance a readily-mis-pressed region and a non-readily-mis-pressed region on the touch screen of the terminal. When the terminal is held by both hands, if the user wants to operate the terminal with his/her left hand, the right hand may touch mistakenly the touch screen of the terminal, therefore a region on the touch screen touched by the left hand of the user is set as a non-readily-mis-pressed region, while a region on the touch screen which may be contacted by the right hand of the user is set as a readily-mis-pressed region. Practical application scenarios are not limited to the above scenario, a typical application scenario is the case that a terminal is held by one hand, wherein the readily-mis-pressed region is a region where a palm may readily press when a terminal such as a mobile phone is held by one hand. Multiple readily-mis-pressed regions can be set. It is necessary to consider different readily-mis-pressed regions when a terminal is held by a left/right hand, only one readily-mis-pressed region takes effect at a time, i.e., when a user holds a terminal with his/her left hand, a certain readily-mis-pressed region corresponding to a left-hand held manner is set to be effective, while a readily-mis-pressed region corresponding to a right-hand held manner is set to be ineffective. The embodiment is so described in an application scenarios where the terminal is held by one hand, and in practical use, other application scenarios are also applicable.

When a predetermined condition is met, such as when a user presses the readily-mis-pressed region, or presses the readily-mis-pressed region for a predetermined second time period, then the timing module 20 starts to time, and the timing module 20 can be a timer arranged in the terminal. Wherein a timing duration (referred to as the first time period) can be set by a user according to his/her usage habits.

During the timing duration, other operations performed by the user on the non-readily-mis-pressed region are all effective operations, the operation module 30 implements functions corresponding to these operations, and stops timing; wherein operations performed by the user on the non-readily-mis-pressed region can be operations which can trigger corresponding functions such as a single-point touch (long press, short press, double click), a multiple-point touch, a sliding operation (direct slide, slide after pressing for a period of time) and the like. After the timing duration elapses, if the user does not perform an operation on the non-readily-mis-pressed region, the operation module 30 will implement a function corresponding to the operation performed by the user on the readily-mis-pressed region. The working principle of the operation module 30 is as follows.

The monitoring unit 31 monitors the operation performed by the user on the touch screen, and distinguishes whether the operation is performed on the readily-mis-pressed region or the non-readily-mis-pressed region, when the monitoring unit 31 detects that the user presses the readily-mis-pressed region (or presses for a predetermined second time period), the timing module 20 is notified to start to time, then before the timing duration elapses, it is detected whether the user performs an operation on the non-readily-mis-pressed region; when there is an operation, the implementation unit 32 is notified to implement the function corresponding to the operation; when the timing duration elapses and the monitoring unit 31 does not detect an operation performed by the user on the non-readily-mis-pressed region, then a function corresponding to the operation performed by the user on the readily-mis-pressed region is implemented, furthermore, the device according to the embodiment can further display related operation results of the implementation unit 32.

By means of the device according to the embodiment, a user can rapidly and simply, without changing usage habits and operation manners, implement accurately user operations, thereby improving greatly user experiences on a terminal. In addition, the device can be widely applicable to various terminal equipments such as a mobile phone, a desk-top telephone and the like. Furthermore, the device can be not only used in a document reading process but also applicable to control of various page displays.

What described are merely preferable embodiments of the disclosure, and are not intended to limit the scope of protection of the disclosure. All equivalent structures and flow changes made by using the specification and accompanying drawings of the disclosure, or direct or indirect applications of the disclosure to other related technical fields should be included within the scope of protection of the disclosure.

The invention claimed is:

1. A method for operating a terminal having a touch screen, comprising:
setting a readily-mis-pressed region and a non-readily-mis-pressed region of the touch screen, wherein the readily-mis-pressed region is set to include a region of the touch screen which is touched by palms of two hands and the non-readily-mis-pressed region is set to include other regions of the touch screen, when the terminal is held by one hand;
monitoring an operation on the touch screen;
distinguishing whether the operation is performed on the readily-mis-pressed region or the non-readily-mis-pressed region;
when detecting that the operation is performed on the readily-mis-pressed region, starting to time;
before a timing duration elapses, detecting whether there is another operation being performed on the non-readily-mis-pressed region;
when the another operation on the non-readily-mis-pressed region is detected, implementing a function corresponding to the another operation on the non-readily-mis-pressed region;
when the timing duration elapses and no operation on the non-readily-mis-pressed region has been detected, implementing a function corresponding to the operation on the readily-mis-pressed region.

2. The method according to claim 1, wherein an operation on the touch screen comprises:
a list interface operation, a document operation, a multi-page application switching operation or a webpage operation.

3. A device for operating a terminal having a touch screen, comprising:
a memory storing programming instructions; and
a processor configured to execute the stored programming instructions to perform steps comprising:
setting a readily-mis-pressed region and a non-readily-mis-pressed region of the touch screen, wherein the readily-mis-pressed region is set to include a region of the touch screen which is touched by palms of two hands and the non-readily-mis-pressed region is set to include other regions of the touch screen, when the terminal is held by one hand;
monitoring an operation on the touch screen;
distinguishing whether the operation is performed on the readily-mis-pressed region or the non-readily-mis-pressed region;
when detecting that the operation is performed on the readily-mis-pressed region, starting to time;
before a timing duration elapses, detecting whether there is another operation being performed on the non-readily-mis-pressed region;
when the another operation on the non-readily-mis-pressed region is detected, implementing a function corresponding to the another operation on the non-readily-mis-pressed region;
when the timing duration elapses and no operation on the non-readily-mis-pressed region has been detected, implementing a function corresponding to the operation on the readily-mis-pressed region.

4. The device according to claim 3, wherein an operation on the touch screen comprises:
a list interface operation, a document operation, a multi-page application switching operation or a webpage operation.

* * * * *